US006834307B2

(12) United States Patent
Magnussen et al.

(10) Patent No.: US 6,834,307 B2
(45) Date of Patent: Dec. 21, 2004

(54) EVENT-BASED APPLICATION LAYER SWITCHING FOR HIGH-SPEED PROTOCOL PROCESSING

(75) Inventors: Andreas Magnussen, Fredensborg (DK); Jacob J Schroeder, Lyngby (DK); Jens K Andreassen, Lyngby (DK); Steen V Kock, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 09/892,519

(22) Filed: Jun. 26, 2001

(65) Prior Publication Data

US 2002/0199006 A1 Dec. 26, 2002

(51) Int. Cl.[7] ............................................. G06F 15/16
(52) U.S. Cl. ..................................... 709/230; 370/455
(58) Field of Search .......................... 709/230; 370/455, 370/456

(56) References Cited

U.S. PATENT DOCUMENTS

| | | | | |
|---|---|---|---|---|
| 4,962,463 | A | * 10/1990 | Crossno et al. ............ | 715/500.1 |
| 5,058,110 | A | * 10/1991 | Beach et al. ................. | 370/464 |
| 5,060,140 | A | * 10/1991 | Brown et al. ............... | 710/105 |
| 5,291,480 | A | * 3/1994 | Nimon ........................ | 370/400 |
| 5,519,690 | A | * 5/1996 | Suzuka et al. ............ | 370/395.3 |
| 5,682,552 | A | * 10/1997 | Kuboki et al. ................. | 710/52 |
| 6,404,752 | B1 | * 6/2002 | Allen et al. .................. | 370/335 |
| 6,529,945 | B1 | * 3/2003 | Calhoun et al. ............. | 709/213 |
| 6,591,310 | B1 | * 7/2003 | Johnson .......................... | 710/3 |
| 6,633,866 | B2 | * 10/2003 | Kishigami ...................... | 707/3 |
| 6,766,381 | B1 | * 7/2004 | Barker et al. ............... | 709/246 |
| 6,791,989 | B1 | * 9/2004 | Steinmetz et al. .......... | 370/412 |
| 2002/0001313 | A1 | * 1/2002 | Benayoun et al. .......... | 370/466 |
| 2002/0026502 | A1 | * 2/2002 | Phillips et al. .............. | 709/219 |
| 2002/0065924 | A1 | * 5/2002 | Barrall et al. ................ | 709/227 |
| 2003/0043825 | A1 | * 3/2003 | Magnussen et al. ......... | 370/401 |
| 2003/0126192 | A1 | * 7/2003 | Magnussen .................. | 709/202 |

OTHER PUBLICATIONS

Kanuma et al, "A CMOS 510K–Transistor Single–Chip Token–Ring LAN Controller (TRC) Compatible with IEEE802.5 MAC Protocol", IEEE, 1990, pp. 132–141.*
Matsuda et al, "A new protocol processing architecture for high–speed networks", IEEE, 1996, pp. 798–803.*
Camarda et al, "Performance evaluation of TCP/IP protocol implementations in end systems", IEEE, 1999, pp. 32–40.*
Khan et al, "An Asynchronous Communication Protocol for Heterogeneous Digital Signal Processing Systems", IEEE, 1995, pp. 761–764.*
Tuan et al, "Reconfigurable Platform Design for Wireless Protocol Processors", IEEE, Apr. 2001, p. 893–896.*
Chen et al, "A Systematic Design of Protocol Processors", IEEE, 1996, pp. 1034–1038.*
Konstantoulakis et al, "A Novel Architecture for Efficient Protocol Processing in High Speed Communication Environments", IEEE, 2000, pp. 425–432.*

* cited by examiner

*Primary Examiner*—Bunjob Jaroenchonwanit
(74) *Attorney, Agent, or Firm*—Pillsbury Winthrop LLP

(57) ABSTRACT

A protocol processing system includes a frame buffer controller to store data. A protocol terminator system is coupled to the frame buffer controller to receive and transmit events. An event queue system is coupled to the protocol terminator system to store the events in an event queue. A protocol processing agent is provided to process a protocol. The protocol processing agent has a first connection with the frame buffer controller and a second connection with the protocol terminator system. The first connection transports the data between the protocol processing agent and the frame buffer controller, and the second connection transports the events between the protocol processing agent and the protocol terminator system.

30 Claims, 3 Drawing Sheets

US 6,834,307 B2

EVENT-BASED APPLICATION LAYER SWITCHING FOR HIGH-SPEED PROTOCOL PROCESSING

BACKGROUND OF THE INVENTION

1. Field of the Invention

The present invention relates to a system and method of high-speed protocol processing. More specifically, the present invention relates to event-based application layer switching for high-speed protocol processing, such as for Transmission Control Protocol (TCP) termination processing.

2. Discussion of the Related Art

Protocol processing entities may be utilized to provide different functionalities from which network operators may choose. A protocol processing entity may include a general central processing unit (CPU) system implementing a particular protocol function, with associated management and control features. For example, a Secure Sockets Layer (SSL) protocol processing entity may be implemented to provide secure communications over a network, and particularly, over the Internet. A Server Load Balancing (SLB) protocol processing entity may be utilized to distribute data efficiently across different network server systems. An Extended Markup Language (XML) protocol processing entity may be utilized to assist in processing data in the XML programming language. Many other protocol processing entities may be utilized to provide additional functionality to a network. Lower-level types of protocols may also be implemented in a protocol processing entity, such as a TCP termination protocol processing entity for terminating traffic from a server or a client in a network. In a typical network system, control information and data are transmitted through the same channels to and from the protocol processing entities. When control information and data are transmitted together, large buffers are required on the protocol processing entities themselves to handle the control information and the data. Moreover, queuing functions are less efficiently implemented by the protocol processing entities when control information and data travel together, which may result in a loss of Quality of Service (QoS) management in the network.

Accordingly, there is a need for a dedicated framework for general high-performance protocol processing for network applications. In particular, there is a need for high-performance protocol processing that is easily upgradeable, and where protocol entities may be partly or fully implemented in hardware.

DETAILED DESCRIPTION

Figure 1:
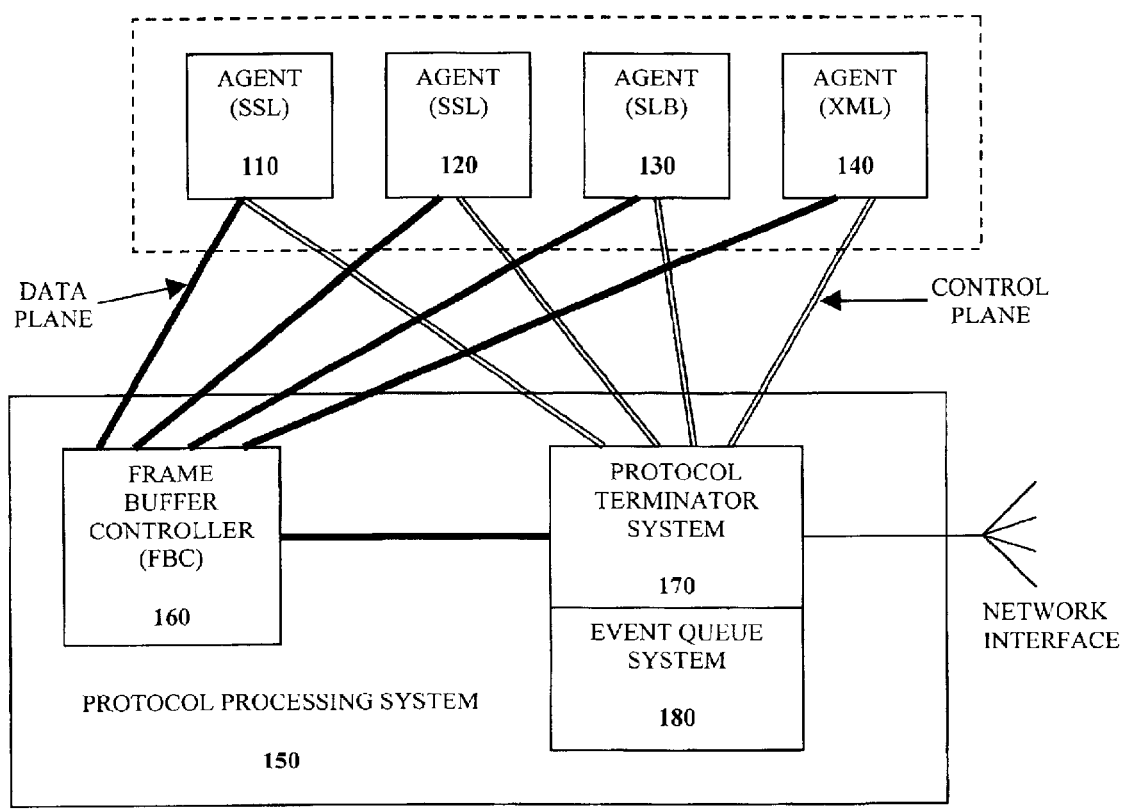
FIG. 1 illustrates a high-speed protocol processing system according to an embodiment of the present invention.

FIG. 1 illustrates a high-speed protocol processing system according to an embodiment of the present invention. The protocol processing system 150 includes a protocol terminator system 170, an event queue system 180, and a frame buffer controller (FBC) 160. A number of external protocol processing agents 110, 120, 130, 140 that provide higher level functionality may be connected to the basic system to provide the higher level functionality (typically Open Systems Interconnect (OSI) Level 5 (session layer) and higher). The protocol processing agents 110, 120, 130, 140 may be implemented in hardware, such as with an application-specific integrated circuit (ASIC), or in software. Agent communication may be implemented in hardware as well. A network interface is preferably connected to the protocol terminator system 170 to provide a connection for the protocol processing system 150 to a network.

The frame buffer controller 160 provides the data plane (the solid black connections in FIG. 1) where all payload data are transmitted between the protocol processing agents 110, 120, 130, 140 and the protocol terminator system 170. The data plane and the control plane (discussed below) are separated. The frame buffer controller 160 provides for a general storage of data with pointer semantics (i.e., requiring a handle or pointer to retrieve data therefrom). Data is preferably stored in the frame buffer controller 160 in data chunks, which are preferably up to 2 KBs each. The frame buffer controller 160 may support larger data chunks, but it is preferable for the protocol terminator system 170 to support a smaller data amount, around 2 KBs. Larger data chunks may be utilized for communication between the protocol processing agents 110, 120, 130, 140, though. However, utilizing smaller data chunks avoids unnecessary complexity in the agents 110, 120, 130, 140.

An FBC handle is preferably utilized to identify a data chunk stored in the frame buffer controller 160. Therefore, when one of the protocol processing agents 110, 120, 130, 140 has written a data chunk to the frame buffer controller 160, an FBC handle or token is returned to that protocol processing agent 110, 120, 130, 140. In other words, the FBC handle is like a key to access a particular data chunk stored in the frame buffer controller 160. When that protocol processing agent 110, 120, 130, 140 desires to retrieve the data chunk, the agent 110, 120, 130, 140 generates a read command to the frame buffer controller 160 with the FBC handle as a parameter. However, there is no requirement that each frame on the network interface maps onto a single data chunk.

Each protocol processing agent 110, 120, 130, 140 is preferably adapted to transmit and retrieve data chunks to and from the frame buffer controller 160 so that each protocol processing agent 110, 120, 130, 140 has complete control over what data it will receive and transmit. It is generally possible to read only a part of a data chunk from the frame buffer controller 160, or read it a number of times, but it is preferable that a complete data chunk be written in one operation.

The protocol terminator system 170 provides the control plane (the double thin-line connections in FIG. 1), where ownership of payload data, for example, is moved between the protocol processing agents 110, 120, 130, 140 and where events (control messages) are exchanged. Events are preferably of constant size, but should be flexible so that new types of control events may be developed as required. Events are not limited to that of passing ownership of payload data, but may be event notifications such as the notification of a timer expiration or a connection setup, for example.

Generally, an event is a notification that a change is occurring that affects the protocol processing agent 110, 120, 130, 140 receiving the event. For example, events may notify a transfer of ownership of a data (e.g., TCP) payload from one agent to another agent. Events are the main mechanism for communication between agents 110, 120, 130, 140, and are utilized for all inter-agent communication that requires an action from the receiving agent. In a sense, a queue of pending events for an agent 110, 120, 130, 140 may be viewed as a queue of pending tasks. When the agent 110, 120, 130, 140 has completed a task and is ready for new processing, it retrieves an event from its event queue 260, 270 (see FIG. 2) and performs any processing required by that event.

According to one embodiment, the size of an event is approximately 16 bytes, and some fields in the event may be predefined, while the remainder may be utilized by firmware for its own requirements. However, any suitable configuration of an event, including its size, may be utilized. The event may include an event type identification field (e.g., being one byte long) to identify the type of the event. This field preferably exists in all events in order to distinguish the different event types. Some examples of event type identification include: timer timeout, new connection setup, or connection payload. The event may also include a TCP pointer field to point to the TCP connection that this event involves. An FBC handle field may be included with the event to refer to the data chunk stored in the frame buffer controller 160 to which it corresponds. An FBC length field may also be provided in an event to indicate the length of the data chunk, e.g., in bytes. An FBC prefetch field may be included in an event to determine whether the data chunk, or part of it, should be prefetched by hardware before the event is processed by a processor.

When an event is a simple event, such as passing ownership of a TCP payload, there would typically not be any control headers or fields in the data chunk stored in the frame buffer controller 160. For some of the more advanced events, such as a request to open a new connection, there may be a control header or field in the data chunk stored in the frame buffer controller 160.

Figure 2:
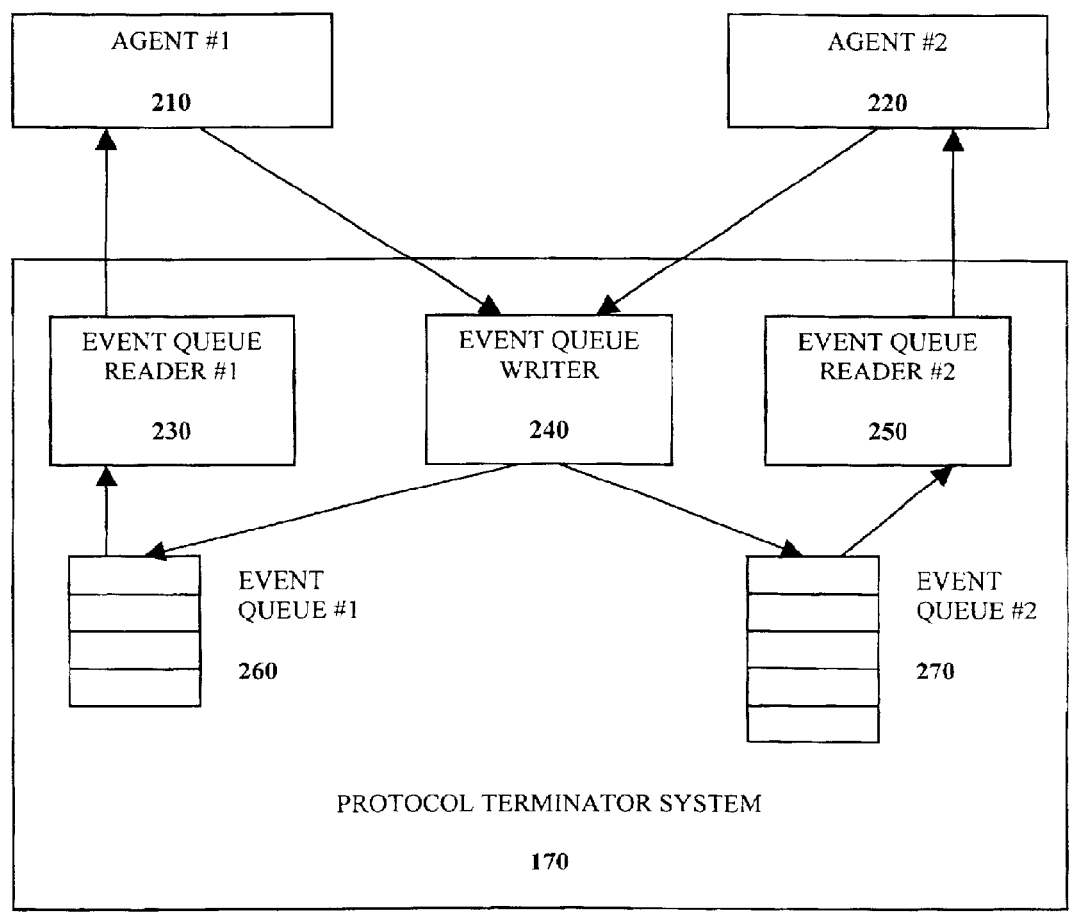
FIG. 2 illustrates a protocol terminator system and two protocol processing agents of a high-speed protocol processing system according to an embodiment of the present invention.
Figure 3:
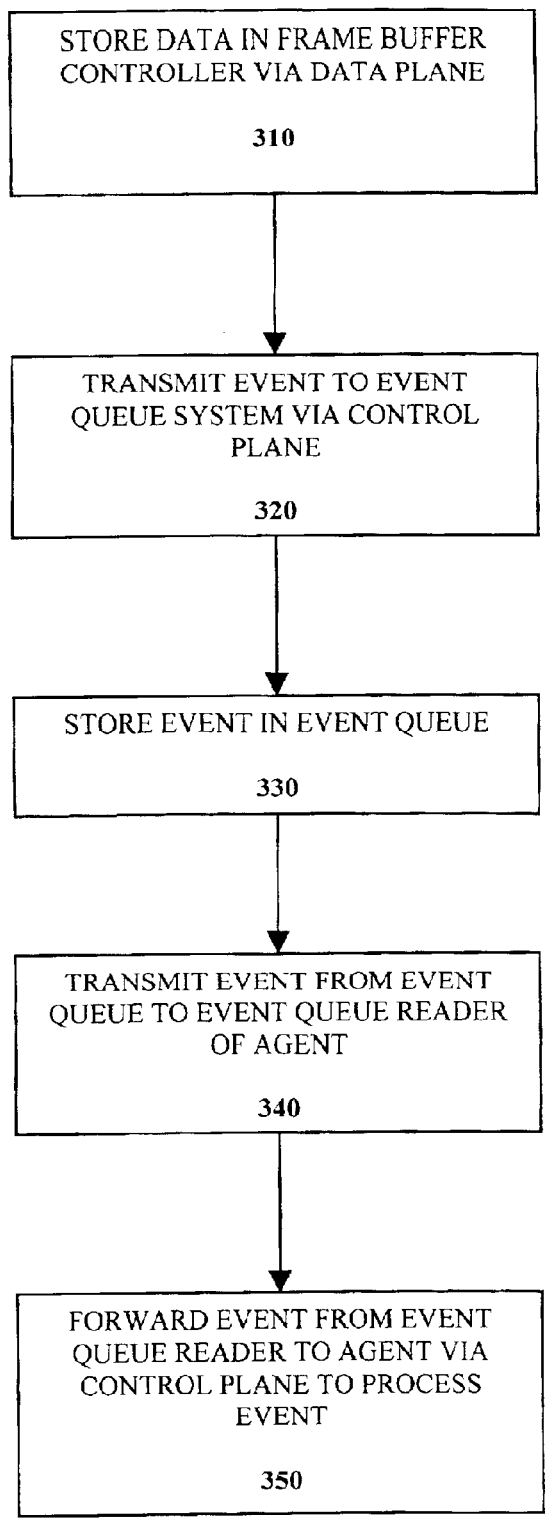
FIG. 3 illustrates a flow chart diagram of a high-speed event-based protocol processing method according to an embodiment of the present invention.

FIG. 2 illustrates a protocol terminator system and two protocol processing agents of a high-speed protocol processing system according to an embodiment of the present invention. The embodiment in FIG. 2 illustrates the event queue system 180 (of FIG. 1) being integrated with the protocol terminator system 170. However, the event queue system 180 and the protocol terminator system 170 may be separated. Events are sent and received by the event queue system 180, and events are delivered by the event queue system 180 to the agents 110, 120, 130, 140. Preferably, low-level flow control is utilized to avoid queue overruns to prevent the loss of events. When an agent 210, 220 transmits an event to the protocol terminator system 170, it is preferably directed to an event queue writer 240. The event queue writer 240 further directs the event to the appropriate event queue 260, 270 corresponding to the particular agent 210, 220 for which the event is designated. Although FIG. 2 illustrates one event queue 260, 270 corresponding to each agent 210, 220, respectively, preferably two event queues (a high-priority event queue and a low-priority event queue) are associated with each agent 210, 220. The event queue reader 230, 250 reads the next event to be processed from the event queue 260, 270 and forwards the event to the corresponding agent 210, 220 for processing. The events within the event queues 260, 270 cycle through the queue 260, 270 so that each event is processed according to the order in which they are received and/or by priority.

Referring to FIG. 1, the protocol terminator system 170 may also host a network interface, which is utilized to transmit frames to and from the outside world. The network interface is preferably a single physical interface having multiple logical interfaces. For example, one use of multiple logical interfaces is in an appliance with a logical interface to the Internet, and a logical interface to the servers. If the protocol processing system 150 is utilized as a TCP termination system, then the protocol terminator system 170 may be adapted to terminate TCP connections on, for example, Internet Protocol version 4 (IPv4) to the network interface, including all IP and TCP options that are utilized in the Internet.

The external protocol processing agents 110, 120, 130, 140 provide additional functionality, usually at protocol layers above TCP, for example, that is not provided by the basic system of the frame buffer controller 160 and the protocol terminator system 170. The interface to the agents is preferably a simple interface, such as a socket-like interface to existing software applications. Because the interfaces to the agents 110, 120, 130, 140 are preferably frame based, it is possible to implement agents loosely from each other (i.e., the agents are not dependent upon each other, nor are they mutually exclusive or inclusive). Although it is preferable that all of the protocol processing agents 110, 120, 130, 140 receive the same interface from the protocol terminator system 170, it is possible to utilize different interfaces to suit the specific agent 110, 120, 130, 140. As stated above, some examples of protocol processing agents 110, 120, 130, 140 may include a Secure Sockets Layer agent 110, 120, a HyperText Transport Protocol (HTTP) Server Load Balancing agent 130, an Extended Markup Language (XML) agent 140, or a TCP termination agent for terminating TCP traffic from the server or client. A TCP termination agent for a client system may utilize a TCP transmit window to store data that was sent but not acknowledged by the receiver. The data in the TCP transmit window may be stored in the TCP Control Block (TCB) record. A TCP termination agent for a server system may utilize a TCP receive window to store data that may have been received out of order. The data in the TCP receive window may be stored in the frame buffer controller 160. However, any other agents may be utilized to provided additional functionality to the protocol processing system 150.

Referring to FIG. 1, if the protocol processing system 150 is utilized as a TCP termination system, then all TCP payloads are preferably transferred through the frame buffer controller 160, while most information in the OSI Level 4 (transport layer) and below is managed by the protocol terminator system 170. As mentioned above, the external protocol processing agents 110, 120, 130, 140 preferably manage all the information in the OSI Level 5 (session layer) and higher.

The protocol terminator system 170 has at least two ways to transfer information between the agents 110, 120, 130, 140. A direct method is to utilize two event queues 260, 270 (a high priority queue and a low priority queue) (see FIG. 2) for each agent 110, 120, 130, 140. Every agent 110, 120, 130, 140 is permitted to place events on other agents' event queues 260, 270. The agent 110, 120, 130, 140 that owns an event queue 260, 270 may retrieve events from its event queue 260, 270 and perform any processing that is required by the event. An indirect method to transfer information between the agents 110, 120, 130, 140 is through shared data structures. The protocol terminator system 170 may provide a memory space and a synchronization mechanism to enable shared data structures, for example, the TCP connection record, or TCP Control Block (TCB), as mentioned above.

Accordingly, the present invention provides a modular system that allows a network operator to easily add new agents as required to provide additional network functionality and implement different protocols. Agents with general processor execution standard software may be utilized with the present invention to implement higher level (TCP and above) protocol processing with high-speed performance.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A protocol processing system, comprising:
a frame buffer controller to store data;
a protocol terminator system coupled to the frame buffer controller to receive and transmit events;
an event queue system coupled to the protocol terminator system to store the events in an event queue; and
a protocol processing agent to process a protocol, the protocol processing agent having a first connection with the frame buffer controller and a second connection with the protocol terminator system, wherein the first connection transports the data between the protocol processing agent and the frame buffer controller, and the second connection transports the events between the protocol processing agent and the protocol terminator system.

2. The protocol processing system according to claim 1, further including a network interface connected to the protocol terminator system, the network interface providing a connection for the protocol processing system to a network.

3. The protocol processing system according to claim 1, wherein the protocol processing agent is a Secure Sockets Layer (SSL) system.

4. The protocol processing system according to claim 1, wherein the protocol processing agent is a Server Load Balancing (SLB) system.

5. The protocol processing system according to claim 1, wherein the protocol processing agent is an Extended Markup Language (XML) system.

6. The protocol processing system according to claim 1, wherein the events include at least one of an event type identification, a Transmission Control Protocol (TCP) pointer, a frame buffer controller handle, a frame buffer controller length, and a frame buffer controller prefetch.

7. The protocol processing system according to claim 1, wherein the data stored in the frame controller buffer includes a header and a data portion.

8. The protocol processing system according to claim 1, wherein the event queue system includes an event queue writer and an event queue reader for the protocol processing agent.

9. A method of high-speed protocol processing, comprising:
storing data in a frame buffer controller;
transmitting an event to an event queue system from a protocol processing agent via a control plane;
storing the event in an event queue;
transmitting the event from the event queue to an event queue reader of the protocol processing agent; and
forwarding the event from the event queue reader to the protocol processing agent via the control plane to process the event.

10. The method according to claim 9, wherein the protocol processing agent is a Secure Sockets Layer (SSL) system.

11. The method according to claim 9, wherein the protocol processing agent is a Server Load Balancing (SLB) system.

12. The method according to claim 9, wherein the protocol processing agent is an Extended Markup Language (XML) system.

13. The method according to claim 9, wherein the event includes at least one of an event type identification, a Transmission Control Protocol (TCP) pointer, a frame buffer controller handle, a frame buffer controller length, and a frame buffer controller prefetch.

14. The method according to claim 9, wherein the data stored in the frame controller buffer includes a header and a data portion.

15. A protocol processing system, comprising:
a machine-readable storage medium;
machine-readable program code, stored on the machine-readable storage medium, having instructions to
store data in a frame buffer controller,
transmit an event to an event queue system from a protocol processing agent via a control plane,
store the event in an event queue,
transmit the event from the event queue to an event queue reader of the protocol processing agent, and
forward the event from the event queue reader to the protocol processing agent via the control plane to process the event.

16. The protocol processing system according to claim 15, wherein the protocol processing agent is a Secure Sockets Layer (SSL) system.

17. The protocol processing system according to claim 15, wherein the protocol processing agent is a Server Load Balancing (SLB) system.

18. The protocol processing system according to claim 15, wherein the protocol processing agent is an Extended Markup Language (XML) system.

19. The protocol processing system according to claim 15, wherein the event includes at least one of an event type identification, a Transmission Control Protocol (TCP) pointer, a frame buffer controller handle, a frame buffer controller length, and a frame buffer controller prefetch.

20. The protocol processing system according to claim 15, wherein the data stored in the frame controller buffer includes a header and a data portion.

21. The protocol processing system according to claim 15, wherein the event queue system includes an event queue writer.

22. A Transmission Control Protocol (TCP) processing system, comprising:
a frame buffer controller to store data;
a TCP terminator system coupled to the frame buffer controller to receive and transmit events;
an event queue system coupled to the TCP terminator system to store the events in at least two event queues;
a first processing agent to process a first protocol, the first processing agent having a first connection with the frame buffer controller and a second connection with the TCP terminator system, wherein the first connection transports the data between the first processing agent and the frame buffer controller, and the second connection transports the events between the first processing agent and the TCP terminator system; and a second processing agent to process a second protocol, the second processing agent having a third connection with the frame buffer controller and a fourth connection with the TCP terminator system, wherein the third connection transports the data between the second processing agent and the frame buffer controller, and the fourth connection transports the events between the second processing agent and the TCP terminator system.

23. The TCP processing system according to claim 22, further including a network interface connected to the TCP terminator system, the network interface providing a connection for the TCP processing system to a network.

24. The TCP processing system according to claim 22, wherein the first processing agent is selected from the group consisting of a Secure Sockets Layer (SSL) system, a Server Load Balancing (SLB) system, and an Extended Markup Language (XML) system.

25. The TCP processing system according to claim 22, wherein the second processing agent is selected from the group consisting of a Secure Sockets Layer (SSL) system, a Server Load Balancing (SLB) system, and an Extended Markup Language (XML) system.

26. The TCP processing system according to claim 22, wherein the events include at least one of an event type identification, a transmission control protocol (TCP) pointer, a frame buffer controller handle, a frame buffer controller length, and a frame buffer controller prefetch.

27. The TCP processing system according to claim 22, wherein the data stored in the frame controller buffer includes a header and a data portion.

28. The TCP processing system according to claim 22, wherein the event queue system includes an event queue writer, a first event queue reader for the first protocol processing agent, and a second event queue reader for the second protocol processing agent.

29. The TCP processing system according to claim 22, wherein the first protocol is selected from the group consisting of a Secure Sockets Layer (SSL) protocol, a Server Load Balancing (SLB) protocol, and an Extended Markup Language (XML) protocol.

30. The TCP processing system according to claim 22, wherein the second protocol is selected from the group consisting of a Secure Sockets Layer (SSL) protocol, a Server Load Balancing (SLB) protocol, and an Extended Markup Language (XML) protocol.

* * * * *